US012576386B2

(12) United States Patent
Chang et al.

(10) Patent No.: US 12,576,386 B2
(45) Date of Patent: Mar. 17, 2026

(54) ALUMINUM-BASED METAL-ORGANIC FRAMEWORK HAVING THREE DIMENSIONAL POROUS STRUCTURE AND COMPRISING AT LEAST TWO TYPES OF LIGANDS, PREPARATION METHOD THEREFOR, AND USE THEREOF

(71) Applicant: KOREA RESEARCH INSTITUTE OF CHEMICAL TECHNOLOGY, Daejeon (KR)

(72) Inventors: Jong-San Chang, Daejeon (KR); Kyung Ho Cho, Daejeon (KR); U Hwang Lee, Daejeon (KR); Young Kyu Hwang, Daejeon (KR); Ji Woong Yoon, Daejeon (KR)

(73) Assignee: Korea Research Institute Of Chemical Technology, Daejeon (KR)

( * ) Notice: Subject to any disclaimer, the term of this patent is extended or adjusted under 35 U.S.C. 154(b) by 1033 days.

(21) Appl. No.: 17/641,975

(22) PCT Filed: Aug. 28, 2020

(86) PCT No.: PCT/KR2020/011543
§ 371 (c)(1),
(2) Date: Mar. 10, 2022

(87) PCT Pub. No.: WO2021/040455
PCT Pub. Date: Mar. 4, 2021

(65) Prior Publication Data
US 2022/0323931 A1      Oct. 13, 2022

(30) Foreign Application Priority Data

Aug. 28, 2019    (KR) ........................ 10-2019-0105949

(51) Int. Cl.
*B01J 20/22*      (2006.01)
*B01J 20/28*      (2006.01)
*C07F 5/06*       (2006.01)

(52) U.S. Cl.
CPC ....... *B01J 20/226* (2013.01); *B01J 20/28064* (2013.01); *C07F 5/066* (2013.01)

(58) Field of Classification Search
CPC .... B01J 20/226; B01J 20/28064; B01J 20/30; B01J 20/28057; B01J 20/28073;
(Continued)

(56) References Cited

FOREIGN PATENT DOCUMENTS

CN        105254901 A       1/2016
DE     102009047201 A1      6/2011
(Continued)

OTHER PUBLICATIONS

Kyu et. al., machine translation of KR 2011-0019804A Description and Claims, Mar. 2, 2011 (Year: 2011).*
(Continued)

*Primary Examiner* — Coris Fung
(74) *Attorney, Agent, or Firm* — HARNESS, DICKEY & PIERCE, P.L.C.

(57) ABSTRACT

The present invention relates to a metal-organic framework (MOF) having a three-dimensional porous structure and being represented by the chemical formula of $[Al_8(OH)_a(BTC)_b(IPA)_c(L)_d]$, a preparation method therefor, and a use thereof as an adsorbent and a catalyst. The novel aluminum-based metal-organic framework with a porous three-dimensional structure can be applied to a low-temperature regenerable composition for moisture absorption due to higher moisture adsorption or desorption capacity than existing moisture adsorbents, and can also be used as an absorbent for absorbing separation of gas due to excellent adsorption capability to nitrogen.

12 Claims, 9 Drawing Sheets

(58) Field of Classification Search
CPC ................ B01J 20/3085; B01J 20/3425; B01J
20/3433; B01J 20/3483; C07F 5/066;
C07F 5/069; B01D 2253/204; B01D
53/02
See application file for complete search history.

(56) References Cited

FOREIGN PATENT DOCUMENTS

| | | |
|---|---|---|
| KR | 10-2011-0019804 A | 3/2011 |
| KR | 10-2019-0026352 A | 3/2019 |
| WO | WO-2018-044874 A1 | 3/2018 |

OTHER PUBLICATIONS

Extended European Search Report dated Oct. 6, 2023 for corresponding European Application No. 20857961.5.
H. Reinsch et al. 'Mixed-linker MOFs with CAU-10 structure: synthesis and gas sorption characteristicst' *Dalton Transactions, RSC Publishing*, 2013, vol. 42, p. 4840-4847.
C. Schlüsener et al. 'Solid-Solution Mixed-Linker Synthesis of Isoreticular Al-Based MOFs for an Easy Hudrophilicity Tuning in Water-Sorption Heat Transformation' *Chemistry of Materials*, 2019, vol. 31, p. 4051-4062.
International Search Report for International Application No. PCT/KR2020/011543 dated Jan. 12, 2021.

* cited by examiner

[FIG. 1]

[FIG. 2]
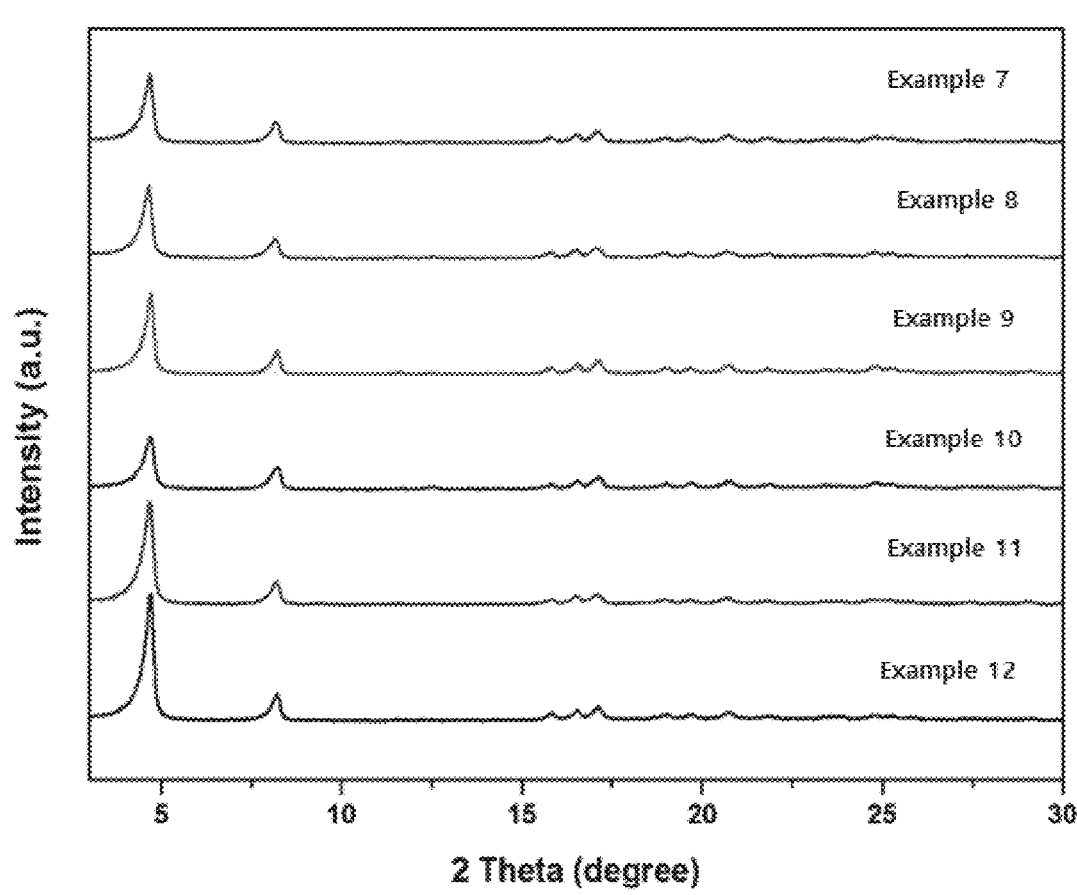

[FIG. 3]
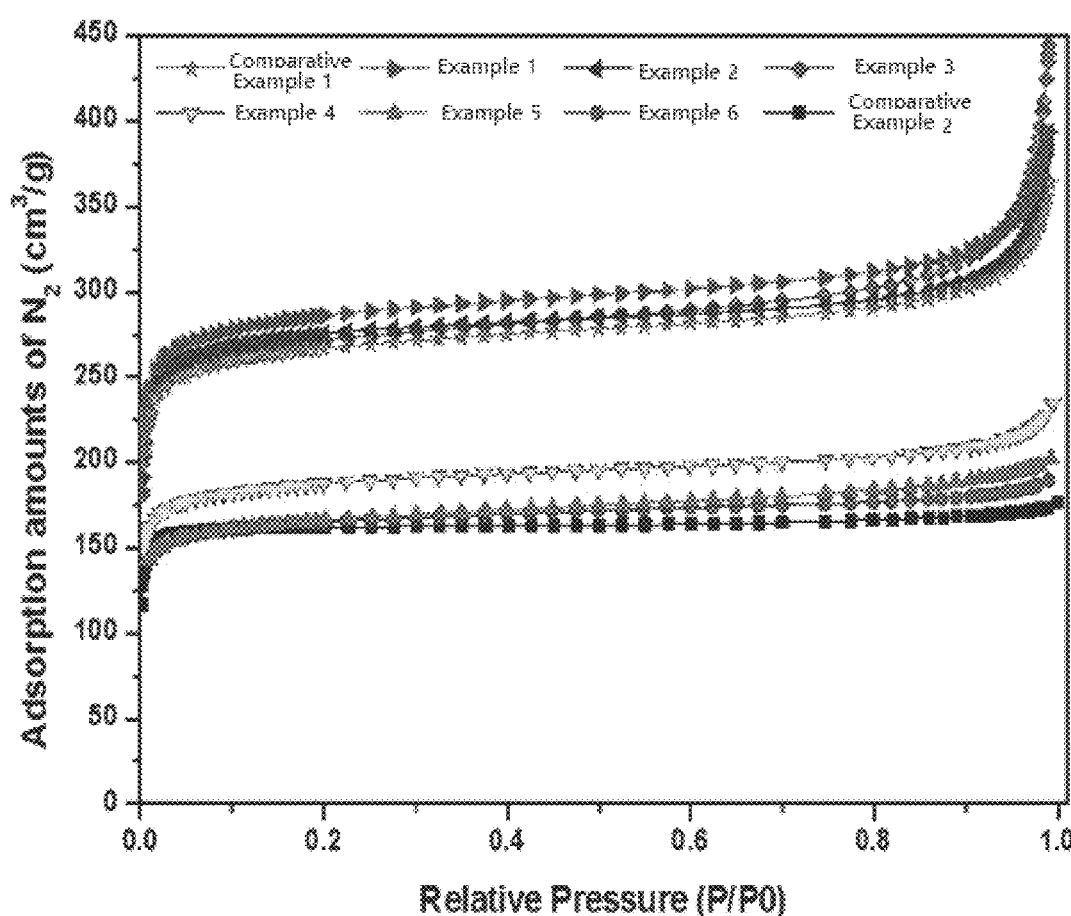

[FIG. 4]
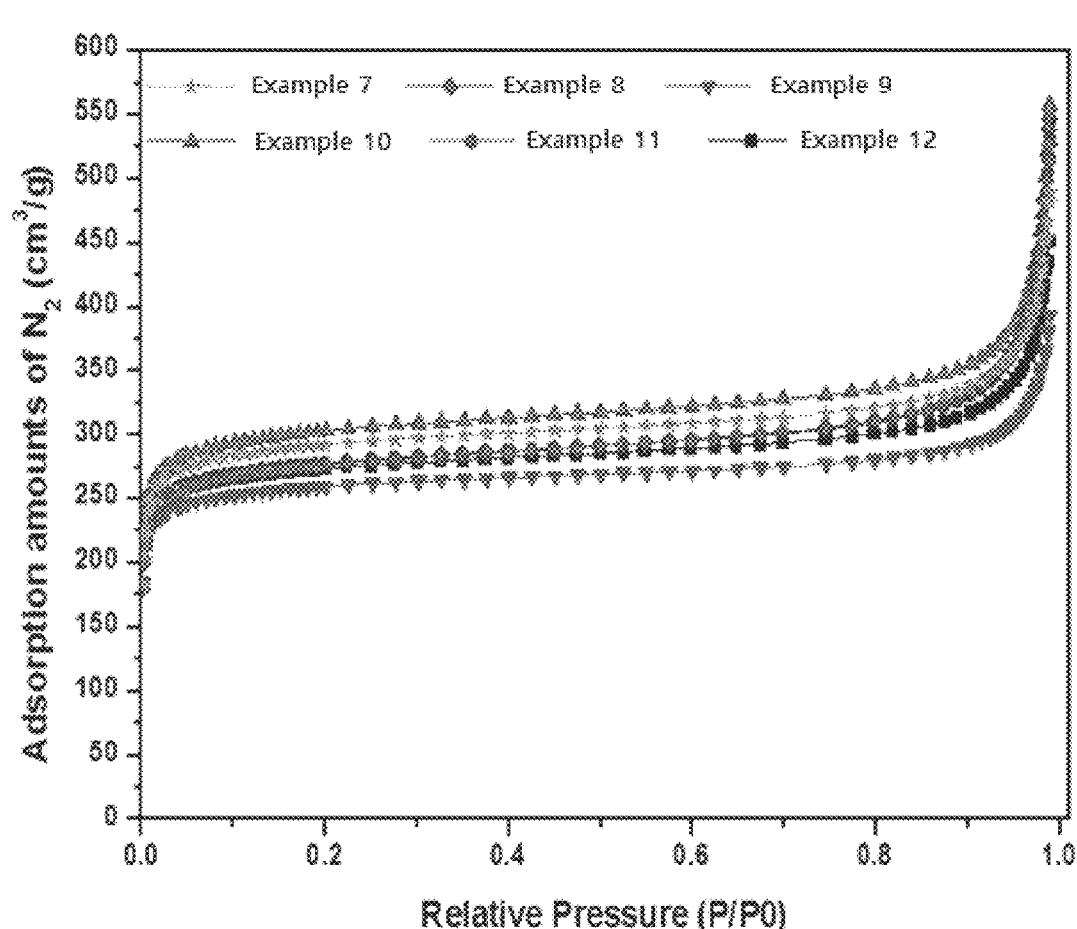

[FIG. 5]
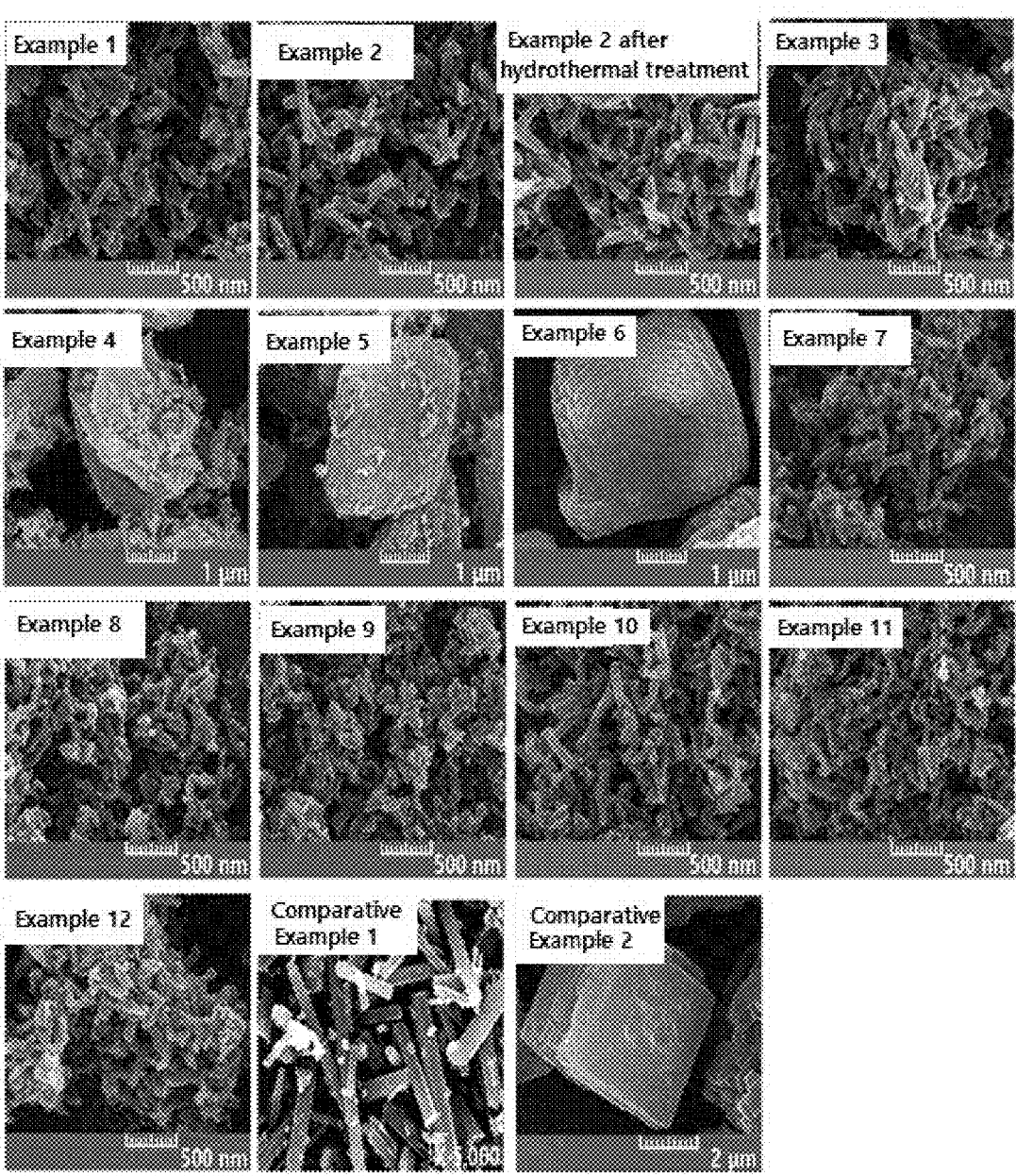

[FIG. 6]
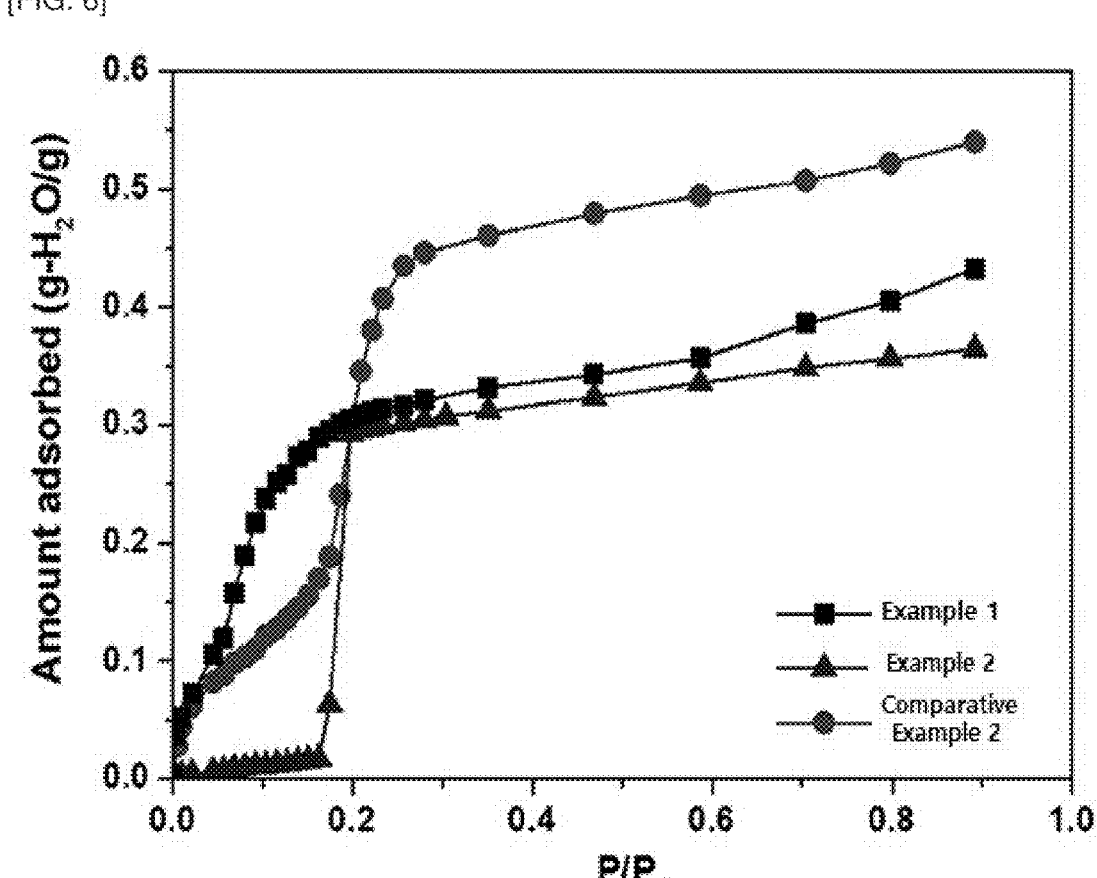

[FIG. 7]
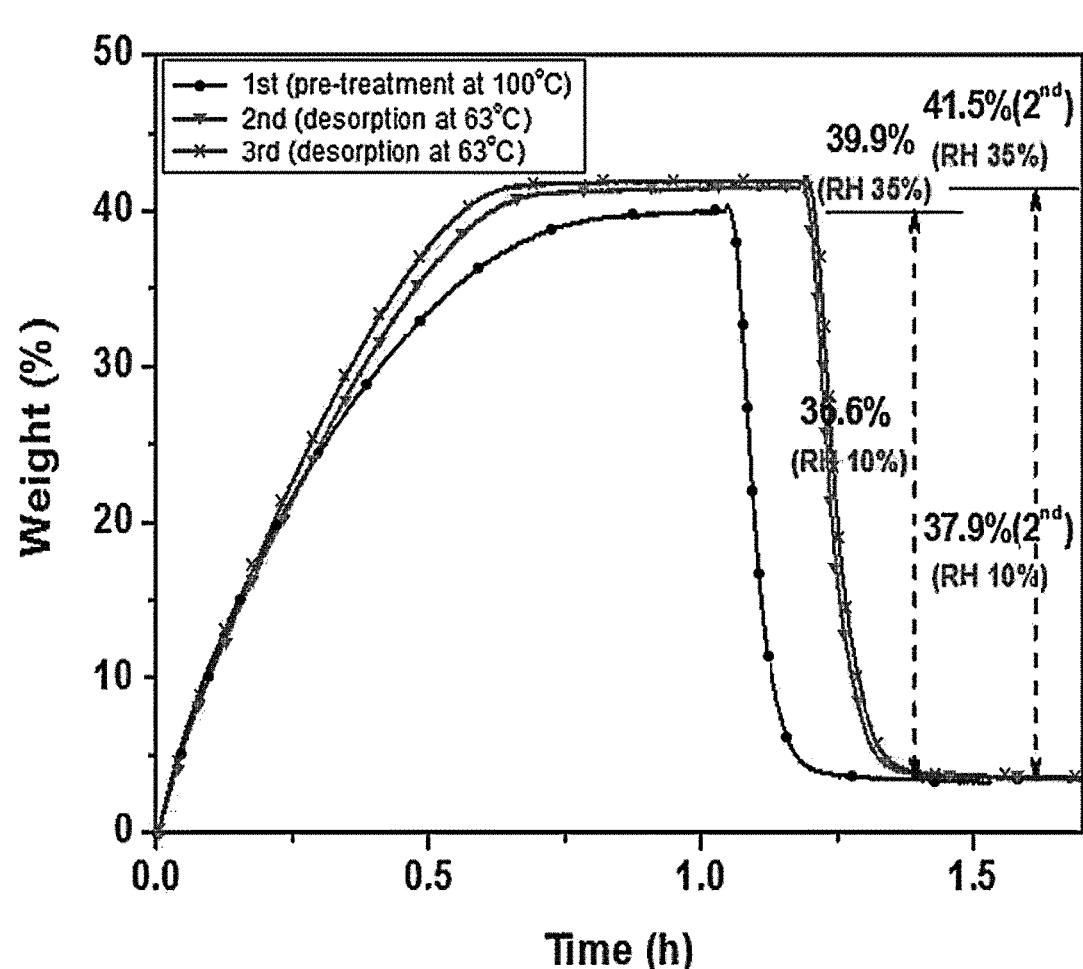

[FIG. 8]
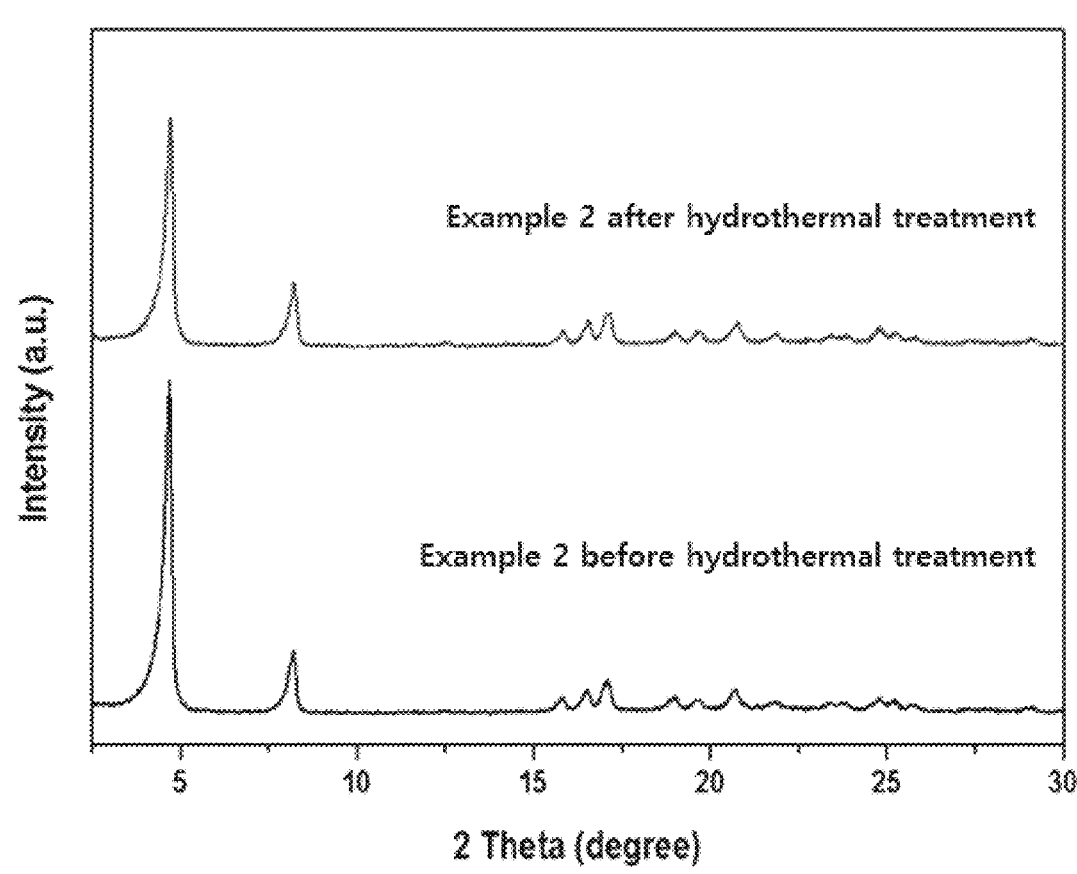

[FIG. 9]

ALUMINUM-BASED METAL-ORGANIC FRAMEWORK HAVING THREE DIMENSIONAL POROUS STRUCTURE AND COMPRISING AT LEAST TWO TYPES OF LIGANDS, PREPARATION METHOD THEREFOR, AND USE THEREOF

CROSS-REFERENCE TO RELATED APPLICATIONS

This application is a national phase under 35 U.S.C. § 371 of PCT International Application No. PCT/KR2020/011543 which has an International filing date of Aug. 28, 2020, which claims priority to Korean Patent Application No. 10-2019-0105949, filed Aug. 28, 2019, the entire contents of each of which are hereby incorporated by reference.

TECHNICAL FIELD

The present invention relates to a metal-organic framework (MOF) with a three-dimensional porous structure represented by a chemical formula of $[Al_8(OH)_a(BTC)_b(IPA)_c(L)_d]$, a preparation method therefor, and uses thereof as an absorbent and a catalyst.

BACKGROUND ART

A metal precursor and organic ligands are placed in a particular solvent and reacted via hydrothermal synthesis, thereby forming a three-dimensional porous material having a repeated arrangement of metal blocks and organic ligands. The metal-organic frameworks thus obtained contain micropores and/or mesopores, leading to a very wide specific surface area. Due to the advantage of such a wide specific surface area, metal-organic frameworks are receiving attention for gas storage. Additionally, metal-organic frameworks have a high degree of freedom in combination of metal precursors and organic ligands, and thus thousands of metal-organic frameworks have been registered in databases thus far.

In the early stage of synthesis of metal-organic frameworks, a single metal and a single organic ligand were used for the synthesis, and further, various organic ligand synthesis methods for controlling pore sizes have been reported. However, in order to synthesize more effective gas storage materials, methods of synthesizing gas storages by mixing several metals and various organic ligands together are being studied.

Metal-organic frameworks have various pore structures, pore sizes, and pore volumes depending on the type thereof, and chemical properties may be imparted through functionalization to metal sites or organic ligands of the metal-organic frameworks according to structural characteristics. Due to such physical and chemical properties, the metal-organic frameworks can be applied to an adsorbent for gas or liquid separation, a material for gas storage, a sensor, a membrane, a functional thin film, a drug delivery material, a filter material, a catalyst, a catalyst carrier, and the like.

In recent years, the superior properties of metal-organic frameworks (MOFs) have triggered research activity in the industry through infinite design patterns derived from combinations of organic and inorganic building blocks. With respect to the application of MOFs, it is a major challenge today to provide a lightweight porous material with high stability, high/low harmfulness potential, and excellent performance. A particular focus is on implementing, for metals, lightweight metals, such as alkali earth metals (magnesium and calcium) and aluminum. Out of these, aluminum is one of the most promising candidates. The interconnection of aluminum-centered octahedrons allows the formation of numerous one-dimensional or two-dimensional metallic sub-networks. The latter has produced various aluminum metal-organic frameworks that have been intensively studied in academia and industry.

Meanwhile, moisture adsorption-type cooling apparatuses can utilize the heat energy generated or absorbed when an adsorbent adsorbs or desorbs moisture for industrial purposes, medium-large buildings, and home cooling. A moisture adsorption-type cooling apparatus designed to be operable by solar heat, industrial waste heat, geothermal heat, or the like of 100° C. or lower for the regeneration of a moisture adsorbent during driving can significantly reduce the $CO_2$ generation and increase energy efficiency, and thus is expected to receive attention as a future eco-friendly energy-saving technique.

In these moisture adsorption-type cooling apparatuses, a heat exchanger having an adsorbent-filled bed is an important component that dominates the overall system performance. Commercially, silica gel and zeolite adsorbents are used as such moisture adsorbents. However, out of these moisture adsorbents, silica gel has a disadvantage in that the adsorption amount by silica gel is low under required relative humidity conditions, and thus the amount (volume) of an adsorbent needed compared with cooling capacity is increased, resulting in difficulty in miniaturization, and zeolite has a disadvantage in that the desorption and regeneration thereof are difficult at a low temperature of 100° C. or lower, resulting in no significant improvement in energy efficiency.

DISCLOSURE

Technical Problem

The present inventors conducted intensive research efforts to develop a novel metal-organic framework with excellent adsorption performance to moisture or gas and, as a result, developed aluminum-based metal-organic frameworks formed by comprising 1,3,5-benzenetricarboxylic acid (BTC) and an additional organic ligand, specifically an isophthalic acid or an analog thereof as a ligand, and identified that these MOFs exhibit excellent effects in moisture adsorption and gas separation and thus can be applied to moisture adsorbents and/or gas separation, thereby completing the present invention.

Technical Solution

A first aspect of the present invention provides a metal-organic framework (MOF) with a three-dimensional porous structure represented by Chemical Formula 1 below:

$$[Al_8(OH)_a(BTC)_b(IPA)_c(L)_d] \qquad \text{[Chemical Formula 1]}$$

wherein,

L is an isophthalic acid analog; and $8 \leq a \leq 22$, $0.15 \leq b \leq 3.1$, and $0.3 \leq c+d \leq 8.1$, in which c and d each are independently a rational number of 0 or greater.

A second aspect of the present invention provides a low-temperature regenerable composition for moisture adsorption, the composition comprising the MOF of the first aspect as a moisture adsorbent.

A third aspect of the present invention provides a composition for gas adsorbing separation, the composition comprising the MOF of the first aspect as a gas adsorbent.

A fourth aspect of the present invention provides a method for preparing a metal-organic framework with a three-dimensional porous structure represented by Chemical Formula 1, the method comprising performing a reaction by hydrothermal synthesis using a reaction solution prepared by adding a ligand precursor solution to a metal precursor solution providing trivalent aluminum ions:

$$[Al_8(OH)_a(BTC)_b(IPA)_c(L)_d] \qquad \text{[Chemical Formula 1]}$$

wherein,

L is an isophthalic acid analog; and $8 \leq a \leq 22$, $0.15 \leq b \leq 3.1$, and $0.3 \leq c+d \leq 8.1$, in which c and d each are independently a rational number of 0 or greater.

Advantageous Effects

The novel aluminum-based metal-organic frameworks with a porous three-dimensional structure formed of mixed ligands of 1,3,5-benzenetricarboxylic acid and isophthalic acid or an isophthalic acid analog can be controlled to have a distinctive crystal structure by adjustment of the content ratio of ligands, can be applied to a low-temperature regenerable composition for moisture absorption due to higher moisture adsorption or desorption capacity than existing moisture adsorbents, and can also be used as an absorbent for absorbing separation of gas due to excellent adsorption capability to nitrogen. Furthermore, the novel aluminum-based metal-organic frameworks of the present invention has excellent durability and high applicability due to improved hydrothermal stability.

DESCRIPTION OF DRAWINGS

FIG. 1 is a graph showing X-ray diffraction analysis results of metal-organic framework (MOF) samples synthesized under the conditions in Examples 1 to 6.

FIG. 2 is a graph showing X-ray diffraction analysis results of MOF samples synthesized under the conditions in Examples 7 to 12.

FIG. 3 shows nitrogen adsorption isotherms measured for analysis of porosity of MOFs synthesized under the conditions in Examples 1 to 6.

FIG. 4 shows nitrogen adsorption isotherms measured for analysis of porosity of MOFs synthesized under the conditions in Examples 7 to 12.

FIG. 5 illustrates scanning electron micrographs showing grain shapes and sizes of Examples 1 to 12 and Comparative Examples 1 and 2.

FIG. 6 is a moisture adsorption and desorption isotherm graph.

FIG. 7 is a graph showing the results of measuring moisture adsorption and desorption weight fractions over time compared with the sample weight under adsorption and desorption conditions.

FIG. 8 is a graph showing X-ray diffraction analysis results before and after hydrothermal treatment.

FIG. 9 is a graph showing the results of performing repeated experiments of moisture adsorption and desorption on the hydrothermally treated sample.

BEST MODE

A first aspect of the present invention provides a metal-organic framework (MOF) with a three-dimensional porous structure represented by Chemical Formula 1 below:

$$[Al_8(OH)_a(BTC)_b(IPA)_c(L)_d] \qquad \text{[Chemical Formula 1]}$$

4 wherein,

L is an isophthalic acid analog; and $8 \leq a \leq 22$, $0.15 \leq b \leq 3.1$, and $0.3 \leq c+d \leq 8.1$, in which c and d each are independently a rational number of 0 or greater.

A second aspect of the present invention provides a low-temperature regenerable composition for moisture adsorption, the composition comprising the MOF of the first aspect as a moisture adsorbent.

A third aspect of the present invention provides a composition for gas adsorbing separation, the composition comprising the MOF of the first aspect as a gas adsorbent.

A fourth aspect of the present invention provides a method for preparing a metal-organic framework with a three-dimensional porous structure represented by Chemical Formula 1, the method comprising performing a reaction by hydrothermal synthesis using a reaction solution prepared by adding a ligand precursor solution to a metal precursor solution providing trivalent aluminum ions:

$$[Al_8(OH)_a(BTC)_b(IPA)_c(L)_d] \qquad \text{[Chemical Formula 1]}$$

wherein,

L is an isophthalic acid analog; and $8 \leq a \leq 22$, $0.15 \leq b \leq 3.1$, and $0.3 \leq c+d \leq 8.1$, in which c and d each are independently a rational number of 0 or greater.

Hereinafter, the present invention will be described in detail.

The present invention was designed to provide a metal-organic framework having superior porosity and excellent moisture and/or gas adsorption and desorption rates even at low temperatures compared with existing known metal-organic frameworks by combining two or more kinds of ligands to synthesize a MOF. The present invention is based on the finding that a repeatedly usable MOF with an adjustable specific surface area and/or pore size, excellent adsorption capability to moisture and other gases, and improved hydrothermal stability can be provided by synthesis using a mixture solution comprising a 1,3,5-benzenetricarboxylic acid ligand and isophthalic acid or an analog thereof at a predetermined ratio.

Hence, the present invention provides a metal-organic framework (MOF) with a three-dimensional porous structure represented by Chemical Formula 1 below:

$$[Al_8(OH)_a(BTC)_b(IPA)_c(L)_d] \qquad \text{[Chemical Formula 1]}$$

wherein,

L is an isophthalic acid analog; and $8 \leq a \leq 22$, $0.15 \leq b \leq 3.1$, and $0.3 \leq c+d \leq 8.1$, in which c and d each are independently a rational number of 0 or greater.

The isophthalic acid analog usable in the MOF of the present invention may be unsubstituted or substituted isophthalic acid, furandicarboxylic acid, thiophenedicarboxylic acid, pyrroledicarboxylic acid, pyrazinedicarboxylic acid, or pyridinedicarboxylic acid. The substituent may be carboxylic acid, hydroxy, nitro, amino, straight or branched $C_{1-6}$ alkyl, $C_{1-6}$ alkoxy, halogen, sulfo, sulfide, or cyano. For example, the isophthalic acid analog may be a compound having an additional reactive group at position 5 of the isophthalic acid backbone. An another example, when the isophthalic acid analog is pyrazine dicarboxylic acid or pyridine dicarboxylic acid based on a heteroaromatic ring containing as a heteroatom a nitrogen atom having a non-covalent electron pair, the nitrogen atom contained therein may combine with Al through the non-covalent electron pair to interfere with crystallization or generate non-porous crystals, and therefore, two carboxylic acid substituents substituted on the ring may be located on a carbon atom far from the nitrogen atom on the heteroaromatic ring. Specifically, the isophthalic acid analog may be selected from the group consisting of 1,2,4-benzenetricarboxylic acid, 5-hydroxy-isophthalic acid, 5-nitroisophthalic acid, 2,5-furandicarboxylic acid, 2,5-thiophenedicarboxylic acid, 2,5-pyrrole dicarboxylic acid, 2,5-pyrazinedicarboxylic acid, 3,5-pyridinedicarboxylic acid, 5-aminoisophthalic acid, 5-alkyl (methyl, ethyl, propyl, or butyl)isophthalic acid, 5-isopropylisophthalic acid, 5-isobutylisophthalic acid, 5-sec-butylisophthalic acid, 5-tert-butylisophthalic acid, 5-halo (e.g., fluoro, chloro, bromo, or iodo)isophthalic acid, 5-sulfoisophthalic acid, 5-sulfideisophthalic acid, 5-alkoxy (e.g., methoxy, ethoxy, propoxy, or butoxy)isophthalic acid, 5-cyanoisophthalic acid, or a combination thereof, but is not limited thereto.

For example, the metal-organic framework of the present invention may show an X-ray diffraction (XRD) pattern having main peaks at 2-theta=$4.66°\pm0.1°$, $8.16°\pm0.1°$, $15.84°\pm0.1°$, $16.54°\pm0.1°$, $17.08°\pm0.1°$, $19.02°\pm0.1°$, $19.64°\pm0.1°$, $20.76°\pm0.1°$, and $21.78°\pm0.1°$ in the X-ray diffraction analysis. The XRD pattern may be measured using Cu K-alpha ($\lambda$=0.15418 nm) beamline, and the peak positions may be changed in the measurement using a different beamline therefrom. This may be commonly applied in the XRD analysis of the metal-organic frameworks of the present invention. The above results indicate that the metal-organic framework according to the first aspect of the present invention has a crystal structure with a hexagonal space group.

Specifically, when $0.18\leq b\leq3.1$ and $0.3\leq c+d\leq8.1$ in the chemical formula of the MOF of the present invention, the corresponding MOF may have a hexagonal crystal structure. The metal-organic framework having a hexagonal crystal structure defined by the chemical formula may have a specific surface area of 900 m²/g to 1500 m²/g or a pore volume of 0.5 cm³/g to 1.0 cm³/g, but is not limited thereto.

Alternatively, the MOF of the present invention may show an XRD pattern having main peaks at 2-theta=$8.28°\pm0.1°$, $9.18°\pm0.1°$, $11.64°\pm0.1°$, $13.12°\pm0.1°$, $14.92°\pm0.1°$, $17.08°\pm0.1°$, $18.48°\pm0.1°$, $19.02°\pm0.1°$, $22.40°\pm0.1°$, $23.46°\pm0.1°$, $24.24°\pm0.1°$, $24.98°\pm0.1°$, $26.72°\pm0.1°$, and $27.88°\pm0.1°$ according to the mixing ratio of ligands. The metal-organic framework according to the first aspect of the present invention has a crystal structure having a tetragonal space group.

Specifically, the MOF of the present invention, when $0.15\leq b\leq0.18$ and $3\leq c+d\leq8.1$ in the chemical formula, may have a mixed hexagonal and tetragonal crystal structure. The metal-organic framework having a mixed hexagonal and tetragonal crystal structure may have a specific surface area of 500 m²/g to 900 m²/g or a pore volume of 0.1 cm³/g to 0.5 cm³/g, but is not limited thereto.

Furthermore, the present invention provides a low-temperature regenerable composition for moisture adsorption comprising a MOF with a three-dimensional porous structure represented by Chemical Formula 1 above as a moisture adsorbent.

A moisture adsorption-type cooling and heating apparatus converts and utilizes the heat energy, generated or absorbed during the moisture adsorption or desorption of an adsorbent contained in a heat exchanger, for industrial uses, medium-large buildings, and home cooling. Especially, a moisture adsorption-type cooling and heating apparatus designed to be operable by solar heat, industrial waste heat, geothermal heat, or the like of 100° C. or lower for the regeneration of a moisture adsorbent during driving can significantly reduce the $CO_2$ generation and increase energy efficiency, and thus is expected to receive attention as a future eco-friendly energy-saving technique. In such moisture adsorption-type cooling and heating apparatuses, a heat exchanger having an adsorbent-filled bed is an important component that dominates the overall system performance. Commercially, silica gel and zeolite adsorbents are used as such moisture adsorbents. However, out of these, silica gel has a disadvantage in that the amount (volume) of an adsorbent needed compared with cooling capacity is increased since the adsorption amount of the silica gel is low under required relative humidity conditions, resulting in difficulty in miniaturization, and zeolite has a disadvantage in that the desorption and regeneration thereof are difficult at a low temperature of 100° C. or lower, resulting in no significant improvement in energy efficiency. However, the MOF of the present invention shows a high moisture adsorption rate under provided relative humidity, for example, a relative humidity of 10 to 50%, and has excellent desorption capability to desorb most of the adsorbed moisture at a low temperature of about 63° C., and thus can be operated by the aforementioned solar heat, industrial waste heat, geothermal heat, or the like, leading to an advantage in energy saving.

It was confirmed in a specific example of the present invention that MOFs comprising, as ligands, 1,3,5-benzenetricarboxylic acid and isophthalic acid or an analog thereof according to the invention showed excellent moisture adsorption capability compared with the MOF of Comparative Example 2 known as a moisture adsorbent used for adsorption-type cooling, that is, the MOF comprising only isophthalic acid as a ligand.

Furthermore, the present invention provides a composition for gas adsorbing separation, the composition comprising a MOF with a three-dimensional porous structure represented by Chemical Formula 1 above as a gas adsorbent.

Specifically, the composition can be used in the adsorbing separation of: natural gas including nitrogen, carbon dioxide, methane, and the like; water and alcohol; olefins and paraffins (e.g., propane/propylene, ethane/ethylene, or the like); or ammonia, nitrogen oxides, sulfur compounds, volatile organics and/or chemical agents in the air, but is not limited thereto.

Meanwhile, the MOF with a three-dimensional porous structure represented by Chemical Formula 1 according to the present invention may be prepared by a process comprising performing a reaction by hydrothermal synthesis using a reaction solution prepared by adding a ligand precursor solution to a metal precursor solution providing trivalent aluminum ions:

$$[Al_8(OH)_a(BTC)_b(IPA)_c(L)_d] \qquad \text{[Chemical Formula 1]}$$

wherein,

L is an isophthalic acid analog; and $8\leq a\leq22$, $0.15\leq b\leq3.1$, and $0.3\leq c+d\leq8.1$, in which c and d each are independently a rational number of 0 or greater.

The isophthalic acid analog is as described above.

The metal precursor providing trivalent aluminum ions may be aluminum chloride, aluminum nitrate, aluminum acetate, an aluminum alkoxide, aluminum phosphate, aluminum sulfate, or the like, but the metal precursor is not limited thereto as long as it can be dissolved in water to provide trivalent aluminum ions.

The hydrothermal synthesis is a method of synthesizing a material by using water or an aqueous solution under high temperature and high pressure. For example, a seed solution is prepared by dissolving a metal precursor and a ligand precursor in water, and then synthesis is performed through hydrothermal synthesis at a temperature of 50° C. to 150° C., specifically 100° C. to 150° C., for 2 hours to 24 hours, and then the reaction solution is cooled and then dried to obtain a metal-organic structure. In an example of the present invention, the reaction was performed at 120° C. for 12 hours. In the present invention, it was confirmed that the introduction of hydrothermal synthesis increased the surface area and porosity of the metal-organic framework and increased the adsorption amount compared with before the introduction of hydrothermal synthesis.

The metal precursor providing trivalent aluminum ions, usable in the preparation method of the present invention, may be aluminum chloride, aluminum nitrate, aluminum acetate, an aluminum alkoxide, or aluminum phosphate, aluminum sulfate, but the metal precursor is not limited thereto as long as it can provide trivalent aluminum ions in a solution.

For example, the metal precursor solution may be prepared by dissolving an aluminum sulfate hydrate ($Al_2(SO_4)_3 \cdot 18H_2O$) in water, and the ligand precursor solution may be prepared by dissolving an isophthalic acid (IPA) ligand and a 1,3,5-benzenetricarboxylic acid (BTC) ligand at a predetermined ratio in water or by mixing the BTC ligand with an isophthalic acid analog ligand, instead of the isophthalic acid ligand, at a predetermined ratio.

Specifically, the reaction solution may comprise the metal precursor and the ligand precursor at a molar ratio of 1:1 to 1:0.3, and the MOF formed according to the mixing ratio may have a hexagonal or/and tetragonal structure.

The used ligand precursor solution may comprise caustic soda, potassium hydroxide, ammonia, sodium aluminate, or a mixture thereof, for pH adjustment. For example, the pH of the solution may be changed depending on the acidity of the aluminum precursor. When the reaction solution is acidic with a pH of 2.7 or less, the crystal structure of the above chemical formula is difficult to form, especially, crystals having a hexagonal structure are not formed. Therefore, the pH of the reaction solution is adjusted by the addition of the above materials, to thereby deprotonate the carboxylic acid group of the organic ligand, thereby facilitating the crystal formation reaction.

The preparation method of the present invention may further comprise collecting and drying crystals after the reaction through hydrothermal synthesis. The drying may be carried out using an oven at 90° C. to 150° C. for 2 to 24 hours, specifically at 90° C. to 110° C. for 2 to 6 hours, but is not limited thereto, and drying methods known in the art may be employed without limitation.

MODE FOR INVENTION

Hereinafter, the present invention will be described in detail through examples. These examples are given for specifically illustrating the present invention, and the scope of the present invention is not limited thereto.

Comparative Example 1: Preparation of Aluminum-Based MOF Comprising Benzenetricarboxylate as Ligand To prepare an aluminum-benzenetricarboxylate MOF, 2.66 g of aluminum nitrate and 1.208 g of 1,3,5-benzenetricarboxylate methyl ester were dissolved in 20 mL of an aqueous solution of 5 M NaOH, followed by reaction at 210° C. for 72 hours using an autoclave reactor. The crystals formed in the reaction solution were washed, filtered, collected, and dried to obtain a product in the form of a powder.

Comparative Example 2: Preparation of Aluminum-Based MOF Comprising Isophthalate as Ligand To prepare an aluminum-isophthalate MOF, 3.2 g of aluminum sulfate and 0.8 g of isophthalic acid were dissolved in a mixture solution of 4 mL of dimethyl formamide and 16 mL of water, followed by reaction at 135° C. for 12 hours using an autoclave reactor. The formed solid was washed with water and ethanol, filtered, and dried to obtain a product in the form of a powder.

Example 1: Preparation of Aluminum-Based MOF Comprising Isophthalic Acid and 1,3,5-Benzenetricarboxylic Acid as Ligands A metal precursor solution was prepared by dissolving 11.6 g of an aluminum sulfate hydrate ($Al_2(SO_4)_3 \cdot 18H_2O$) in 35 mL of water. To prepare a ligand precursor solution, caustic soda in the same molar amount as a carboxyl functional group of a ligand to be used was dissolved in 120 mL of water, and then 0.96 g of sodium aluminate was dissolved therein. In the solution, 2.33 g of an isophthalic acid (IPA) ligand and 6.87 g of a 1,3,5-benzenetricarboxylic acid (BTC) ligand were dissolved, thereby preparing a ligand solution. While the metal precursor solution thus prepared was stirred, the ligand precursor solution was slowly added, thereby preparing a reaction solution. After stirring for 10 minutes, the reaction solution was subjected to reaction by stirring in a round flask equipped with a reflux cooler. For synthesis, a reaction was performed at 120° C. for 12 hours, and after the reaction was completed, the reaction solution was cooled, and crystals formed inside the reaction solution were obtained through filtration. To remove impurities contained in the formed crystals, the crystals were washed with water and ethanol, and dried in a dry oven at 100° C. to obtain a product in the form of a powder.

Examples 2 to 6 Preparation of Aluminum-Based MOFs Comprising Isophthalic Acid and 1,3,5-Benzenetricarboxylic Acid According to Mixing Ratios of Ligand Precursors Aluminum-based MOFs comprising BTC and IPA as ligands were prepared by way of the same method as in Example 1, wherein a series of products were synthesized by varying the mixing ratio of BTC and IPA ligands. The specific mass ratios of the used ligands are shown in Table 1 below.

TABLE 1

| Classification | 1,3,5-Benzenetricarboxylic acid (g) | Isophthalic acid (g) |
|---|---|---|
| Example 1 | 6.87 | 2.33 |
| Example 2 | 4.90 | 3.88 |
| Example 3 | 3.92 | 4.65 |
| Example 4 | 2.94 | 5.43 |
| Example 5 | 1.96 | 6.20 |
| Example 6 | 0.98 | 6.98 |

Examples 7 to 12 Preparation of Aluminum-Based
MOFs Comprising Isophthalic Acid Analogs and
1,3,5-Benzenetricarboxylic Acid as Ligands A series of aluminum-based MOFs comprising two kinds
of ligands were prepared by way of the same method as in
Example 1 except that instead of the isophthalic acid ligand,
an analog thereof was used as a ligand. The kinds of
isophthalic acid analogs used are shown in Table 2 below,
and the amount used was adjusted so as to have a molar ratio
of 1:1 with 1,3,5-benzenetricarboxylic acid.

TABLE 2

| Classification | Kind of isophthalic acid analog | 1,3,5-Benzenetricarboxylic acid (g) | Isophthalic acid analog (g) |
|---|---|---|---|
| Example 7 | 1,2,4-benzenetricarboxylic acid | 4.90 | 4.90 |
| Example 8 | 5-hydroxyisophthalic acid | 4.90 | 4.25 |
| Example 9 | 5-nitroisophthalic acid | 4.90 | 4.93 |
| Example 10 | 2,5-furandicarboxylic acid | 4.90 | 3.65 |
| Example 11 | 3,5-pyridinedicarboxylic acid | 4.90 | 3.90 |
| Example 12 | 5-aminoisophthalic acid | 4.90 | 4.23 |

Experimental Example 1: X-Ray Diffraction
Analysis

Figure 1:
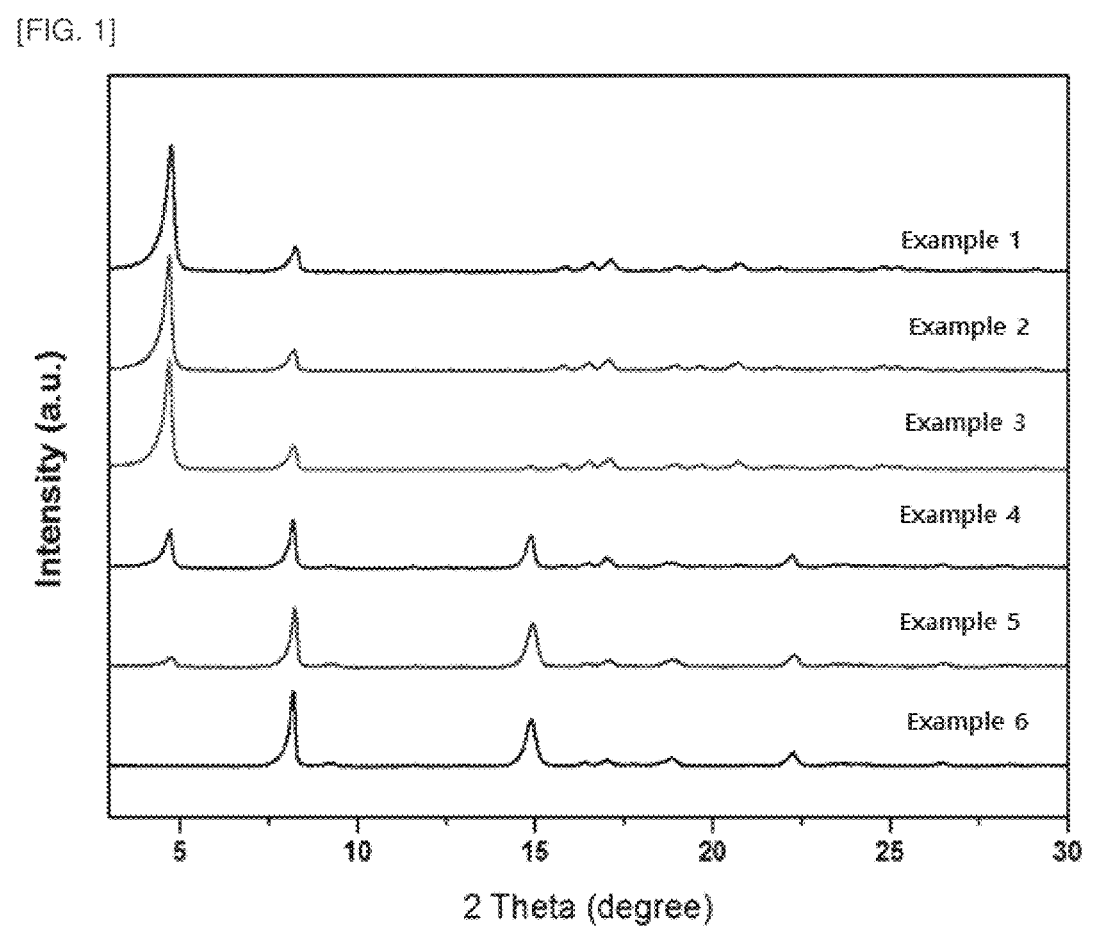

For the crystal structure analysis of the MOFs obtained in
Examples 1 to 12, X-ray diffraction analysis was performed,
and the results are shown in FIGS. 1 and 2. As shown in FIG.
1, it was confirmed that the MOFs prepared in Examples 1
to 3 had a hexagonal crystal structure, and the MOFs
prepared in Examples 4 to 6 had a mixed hexagonal and
tetragonal crystal structure. The MOFs in Examples 7 to 12
synthesized by varying the kind of ligand were observed to
show X-ray diffraction patterns of a hexagonal crystal
structure as shown in FIG. 2. As a result of X-ray diffraction
analysis in FIGS. 1 and 2, no diffraction pattern associated
with impurities was observed in the presented patterns.
These results indicate that the MOFs of the present invention
have a crystal structure resulting from mixed ligands.

Experimental Example 2: Analysis of Physical
Properties According to Ratio and Kinds of Mixed
Ligands To investigate the ratio of the two ligands constituting the
MOFs prepared in Examples 1 to 12 and Comparative
Examples 1 and 2, nuclear magnetic resonance (NMR)
spectroscopy was used. For the nuclear magnetic resonance
spectroscopy, each sample was prepared by dissolving a
predetermined powder sample in a 10% $NaOD/D_2O$ solu-
tion. Specifically, the difference in the degree of chemical
shift of hydrogen protons was quantified by using the
differences resulting from the differences in the environment
and number of hydrogen according to the types of dissolved
ligands comprised in the solution. The ratio of the ligands
constituting each MOF, calculated from NMR spectroscopy,
is shown in Table 3 below. In the MOFs of Examples 1 to
6 synthesized while the ratio of 1,3,5-benzenetricarboxylic
acid and isophthalic acid was adjusted, the content of
1,3,5-benzenetricarboxylic acid was decreased, and the con-
tent of isophthalic acid was increased from Example 1 to
Example 6 in light of the amounts of the ligands used in the synthesis. Meanwhile, in the MOFs in Examples 7 to 12
prepared using 1,3,5-benzenetricarboxylic acid and isoph-
thalic acids analog instead of isophthalic acid at a molar ratio
of 1:1, the relative content distributions of 1,3,5-benzenet-
ricarboxylic acid and isophthalic acid analogs were 70.1 mol
% to 86.3 mol % and 13.7 mol % to 29.9 mol %, respec-
tively.

Furthermore, the MOFs prepared in Examples 1 to 12 and
Comparative Examples 1 and 2 were measured for nitrogen
adsorption isotherms, and the results are shown in FIGS. 3
and 4. In addition, the surface area (SBFT), the pore volume
($V_p$), and the like were calculated therefrom, and the results
are summarized in Table 3 below. Specifically, a pre-treat-
ment was performed in the vacuum condition at 150° C. for
12 hours prior to measurement, and then nitrogen was
adsorbed at a liquid nitrogen temperature of −196° C. to
obtain an adsorption isotherm. In addition, the surface area
was calculated using the BET equation, the pore volume was
calculated using the nitrogen adsorption amount at a relative
pressure of 0.99, and the surface area ($S_{micro}$) and volume
($V_{micro}$) for micropores were calculated using a t-plot
method.

As for the calculated specific surface areas and pore
volumes, it was identified that like in the X-ray diffraction
analysis results in Experimental Example 1 above, the
composition of the synthetic solution is changed due to the
use of mixing ligands to form MOFs with different struc-
tures, thereby controlling the increase or decrease in surface
area. When instead of isophthalic acid constituting the
metal-organic framework, 1,3,5-benzenetricarboxylic acid
as a ligand to be mixed is used to configure the framework,
the specific surface area was minutely increased. In addition,
all of the aluminum metal-organic framework structures in
Examples 7 to 12, into which both 1,3,5-benzenetricarboxy-
late and isophthalic acid analog ligands were introduced,
showed a surface area of 1000 $m^2$/g or more.

TABLE 3

| Classification | $S_{BET}$ ($m^2$/g) | $V_p$ ($cm^3$/g) | $S_{micro}$ ($m^2$/g) | $V_{micro}$ ($cm^3$/g) | 1,3,5-Benzene-tricarbo xylic acid (mol %) | Isophthalic acid or analog thereof (mol %) |
|---|---|---|---|---|---|---|
| Comparative Example 1 | 1053 | 0.563 | 974 | 0.374 | 100 | 0 |
| Example 1 | 1134 | 0.608 | 1049 | 0.401 | 94.2 | 5.8 |
| Example 2 | 1098 | 0.608 | 1034 | 0.395 | 78.8 | 21.2 |
| Example 3 | 1075 | 0.679 | 1002 | 0.393 | 60.8 | 39.2 |
| Example 4 | 742 | 0.362 | 689 | 0.265 | 33.7 | 66.3 |
| Example 5 | 655 | 0.313 | 613 | 0.243 | 21.1 | 78.9 |
| Example 6 | 657 | 0.293 | 615 | 0.236 | 11.2 | 88.8 |
| Comparative Example 2 | 671 | 0.256 | 659 | 0.244 | 0 | 100 |
| Example 7 | 1154 | 0.744 | 1060 | 0.405 | 86.3 | 13.7 |
| Example 8 | 1086 | 0.797 | 974 | 0.371 | 81.8 | 18.2 |
| Example 9 | 1026 | 0.608 | 959 | 0.368 | 70.1 | 29.9 |
| Example 10 | 1194 | 0.850 | 1087 | 0.415 | 78.8 | 21.2 |
| Example 11 | 1099 | 0.824 | 1099 | 0.379 | 78.6 | 21.4 |
| Example 12 | 1083 | 0.697 | 995 | 0.380 | 77.6 | 22.4 |

As shown in FIG. 3, the nitrogen adsorption amount was
rapidly increased when the ratio of 1,3,5-benzenetricarbox-
ylic acid to isophthalic acid used in synthesis was increased
above a predetermined value. On the other hand, as shown
in FIG. 4, the substitution of isophthalic acid with isoph-
thalic acid analogs resulted in no great difference in the
nitrogen adsorption amount due to the ligand substitution,
and the levels thereof were similar to those of Example 1
and/or Example 2 having similar content ratios of ligands.

This indicates that the effect of ligand substitution on nitrogen adsorption is not great as long as the similarity of the framework is maintained, and that the nitrogen adsorption depends on the contents of ligands. The measurement of porosity at a regeneration temperature of lower than 100° C. after actual moisture adsorption means the effective surface area and pore volume under the conditions in which an actual adsorbent is operated, and therefore, the surface area and pore volume were measured from the nitrogen adsorption isotherm of a sample pre-treated for 12 hours under the vacuum condition at 100° C., and the results are shown in Table 4 below. As shown in Table 4, Comparative Example 1, when measured for porosity after pre-treatment at 100° C., showed a surface area of 767 m²/g, significantly lower than 1053 m²/g, a surface area value measured after pre-treatment at 150° C. Also, in the case of Example 11, the measured surface area value was lowered due to a lowered pre-treatment temperature. However, in the cases of Examples 7 to 12 excluding Examples 2 and 11, the surface area values were mostly similar or somewhat higher compared with the surface area values measured at 150° C. The different surface area and pore volume values observed depending on the pre-treatment temperature of a sample in the measurement of the nitrogen adsorption isotherm as such are associated with the degree of desorption of moisture adsorbed on the sample surface, and the ease of desorption of moisture from the surface can be guessed from these measurement results. For example, in the cases of Comparative Example 1 and Example 11, in which the specific surface area value measured after pre-treatment at 100° C. was significantly lower than that measured after pre-treatment at 150° C., such results may be due to insufficient desorption of moisture even at a temperature of 100° C. It can therefore be seen that the MOF adsorbents configured of two or more kinds of ligands showed improved low-temperature regenerability compared with existing adsorbents and had higher porosity, and thus are highly applicable as moisture adsorbents.

TABLE 4

| Classification | $S_{BET}$ (m²/g) | $V_g$ (cm³/g) | $S_{micro}$ (m²/g) | $V_{micro}$ (cm³/g) |
|---|---|---|---|---|
| Comparative Example 1 | 767 | 0.555 | 674 | 0.253 |
| Example 2 | 1242 | 0.645 | 1158 | 0.436 |
| Example 7 | 1073 | 0.703 | 969 | 0.366 |
| Example 8 | 1143 | 0.805 | 1028 | 0.388 |
| Example 9 | 1226 | 0.678 | 1145 | 0.436 |
| Example 10 | 1260 | 0.810 | 1146 | 0.436 |
| Example 11 | 650 | 0.610 | 565 | 0.211 |
| Example 12 | 1147 | 0.697 | 1050 | 0.400 |

Scanning electron micrographs of Examples 1 to 12 and Comparative Examples 1 to 2 were obtained, and the results are shown in FIG. 5. As shown in FIG. 5, crystals of 500 nm or less were uniformly generated in Examples 1 to 3 and Examples 7 to 12, which predominantly have an X-ray diffraction pattern of a hexagonal crystal structure confirmed in FIGS. 1 and 2, and relatively large grains were generated in Examples 4 to 6 and Comparative Examples 1 and 2, which have a tetragonal crystal structure.

Experimental Example 3: Evaluation of Moisture Adsorption Under Equilibrium Conditions For evaluation of the applicability of the MOF prepared in Example 2 as a moisture adsorbent, the moisture adsorption evaluation was performed, and the results are shown in FIG. 6. Comparative Example 2, which is known to exhibit high performance as a moisture adsorbent for adsorption-type cooling, was also evaluated for moisture adsorption. The moisture adsorption characteristics were measured using an IGA gravimetric adsorption apparatus by Hiden. For the pre-treatment of the sample, the sample was dried at a vacuum degree of $10^{-6}$ Torr and 100° C. for 2 hours, and then the temperature was lowered to 30° C., and in the range of $P/P_0$=0-1.0, the water vapor pressure compared with the saturated vapor pressure, the adsorption and desorption isotherms were measured. As shown in FIG. 6, in the moisture adsorption and desorption isotherms, the aluminum-1,3,5-benzenetricarboxylate metal-organic composite prepared in Comparative Example 1 showed a similar adsorption amount to the aluminum-isophthalate having S-shaped adsorption characteristic of Comparative Example 2, but exhibited moisture adsorption in a vapor pressure in the region of $P/P_0$<0.1 and saturation with moisture in the region of $P/P_0$=0.2, due to relatively strong hydrophilicity. On the other hand, Example 2 prepared using the mixed ligands of the present invention showed an S-shaped moisture adsorption isotherm having characteristics of an energy-saving moisture adsorbent, saturation with moisture in the region of $P/P_0$=0.2, with an adsorption amount of 0.45 g/g, and a 1.5-fold adsorption capacity compared with Comparative Example 1 or 2 in the region of $P/P_0$=0.2-0.25. These results showed significant improvements compared with the moisture adsorption performance and characteristics of the MOFs of Comparative Examples 1 and 2 prepared with a single ligand of 1,3,5-benzenetricarboxylic acid or isophthalic acid, indicating that a novel MOF adsorbent composed of mixed ligands of two or more kinds of ligands according to the present invention exhibits superior moisture adsorption performance.

Experimental Example 4: Evaluation of Moisture Adsorption-Desorption Repetition

As confirmed in Experimental Example 4, the MOF prepared according to Example 2 exhibited higher moisture adsorption capacity than the MOFs prepared in Comparative Examples 1 and 2, and showed S-shaped moisture adsorption characteristics that can be applied as an energy-saving moisture adsorbent. Therefore, the adsorption-desorption repetition performance was measured under the conditions in which an actual moisture adsorption-type cooling apparatus was driven. As for the measurement method, a separate humidity controller was connected to a gas supply unit supplied to a thermogravimetric analyzer, thereby controlling the humidity in a chamber loading a sample, and the adsorption and desorption experiment was conducted through temperature control inside the chamber. The moisture adsorption and desorption weight fraction compared with the sample weight under adsorption and desorption conditions was measured over time, and the results are shown in FIG. 7. The sample was pre-treated at 100° C. for 2 hours before the first adsorption experiment. Thereafter, the temperature was lowered to 30° C., and then adsorption was induced while nitrogen-containing water vapor corresponding to a relative humidity of 35 was allowed to flow. After the adsorption was completed, desorption was carried out at a temperature of 63° C. while nitrogen-containing water vapor corresponding to a relative humidity of 10 was allowed to flow. As shown in FIG. 7, the adsorption capacity in the first adsorption-desorption experiment was 36.6%, and the adsorption capacity after the second and third repetition experiments was 37.9%, indicating a high adsorption and desorption capacity. These results indicate that the adsorbent exhibits excellent low-temperature regenerability and has stability against moisture, so that the adsorbent can sufficiently desorb the adsorbed water to maintain high adsorption capacity even under low-temperature regeneration conditions in which an actual energy-saving adsorption-type cooling apparatus is operated.

Figure 9:
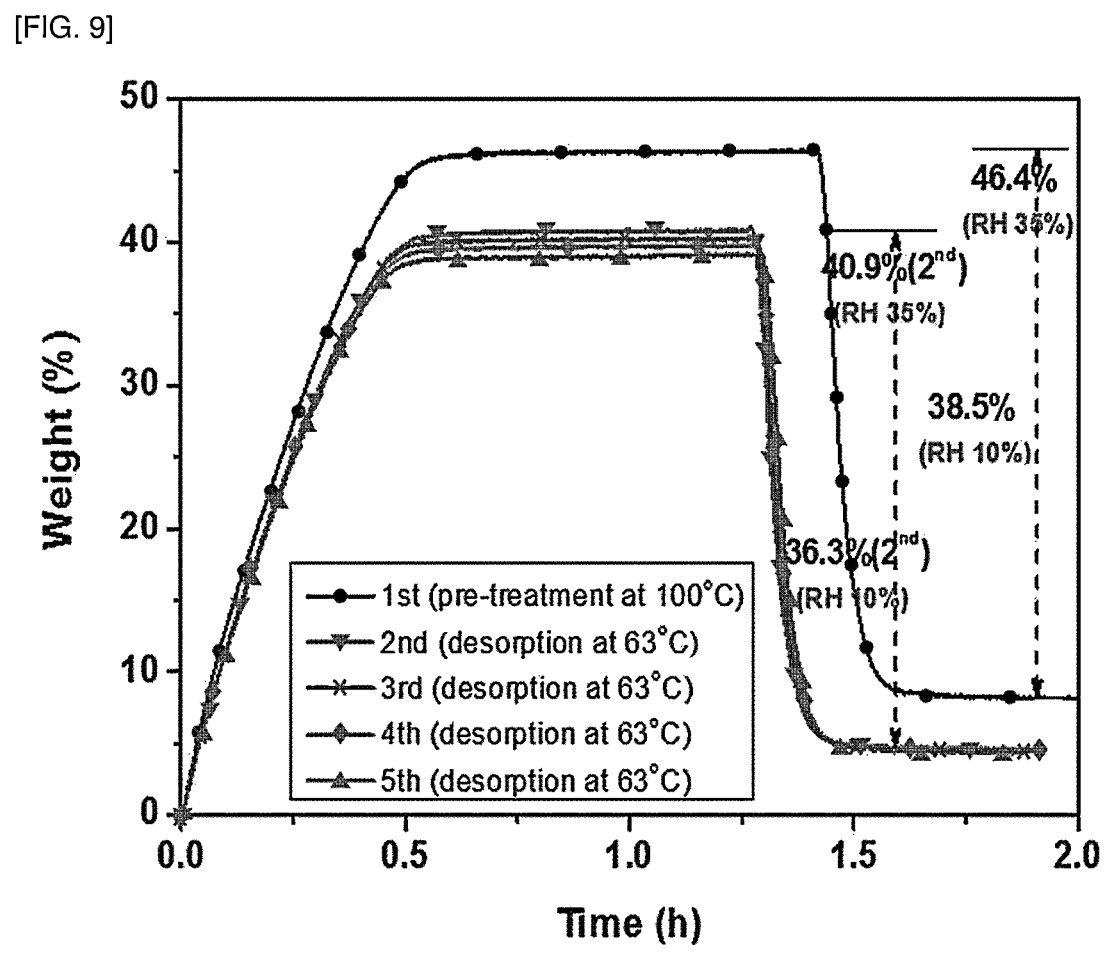

Experimental Example 5: Evaluation of Moisture Adsorption-Desorption Repetition of Hydrothermally Treated Sample The hydrothermal stability of MOFs for moisture adsorbent applications is a requirement for heat transfer uses, and thus the evaluation of durability of an adsorbent is essential. Therefore, the adsorbent prepared in Example 2 was evaluated for hydrothermal stability. After 0.5 g of the metal-organic framework prepared in Example 2 was dispersed in 30 mL of distilled water, the dispersion was loaded in an autoclave reactor and hydrothermally treated in an oven at 110° C. for one day. X-ray diffraction analysis was performed to investigate the crystal structure change before and after hydrothermal treatment, and the results are shown in FIG. 8. As shown in FIG. 8, the same diffraction peaks as before the hydrothermal treatment were maintained even after the hydrothermal treatment, and these results were also consistent with the maintenance of crystals confirmed in the scanning electron micrograph presented in FIG. 5. In addition, the moisture adsorption and desorption repetition experiments were performed on the sample hydrothermally treated by way of the same method as in Experimental Example 4, and the results are shown in FIG. 9. As shown in FIG. 9, the MOF after the hydrothermal treatment showed an adsorption capacity of 36% in repeated adsorption and desorption, and these results indicate that the high adsorption capacity was still maintained even after the hydrothermal treatment, compared with before hydrothermal treatment, meaning that the MOF has suitable stability for application in the moisture adsorbent application field.

The invention claimed is:

1. A metal-organic framework (MOF) having a hexagonal crystal structure or a mixed hexagonal and tetragonal crystal structure with a three-dimensional porous structure represented by Chemical Formula 1 below:

$$[Al_8(OH)_a(BTC)_b(IPA)_c(L)_d] \qquad \text{[Chemical Formula 1]}$$

wherein

L is an isophthalic acid analog; and $8 \leq a \leq 22$, $0.15 \leq b \leq 3.1$, and $0.3 \leq c+d \leq 8.1$, in which c and d each are independently a rational number of 0 or greater, wherein BTC represents 1,3,5-benzenetricarboxylic acid, and IPA represents isophthalic acid.

2. The metal-organic framework of claim 1, wherein the isophthalic acid analog is selected from the group consisting of 1,2,4-benzenetricarboxylic acid, 5-hydroxyisophthalic acid, 5-nitroisophthalic acid, 2,5-furandicarboxylic acid, 2,5-thiophenedicarboxylic acid, 2,5-pyrrole dicarboxylic acid, 2,5-pyrazinedicarboxylic acid, 3,5-pyridinedicarboxylic acid, 5-aminoisophthalic acid, 5-alkyl (methyl, ethyl, propyl, or butyl) isophthalic acid, 5-isopropylisophthalic acid, 5-isobutylisophthalic acid, 5-sec-butylisophthalic acid, 5-tert-butylisophthalic acid, 5-halo (e.g., fluoro, chloro, bromo, or iodo) isophthalic acid, 5-sulfoisophthalic acid, 5-sulfideisophthalic acid, 5-alkoxy (e.g., methoxy, ethoxy, propoxy, or butoxy) isophthalic acid, and 5-cyanoisophthalic acid.

3. The metal-organic framework of claim 1, wherein the metal-organic framework has the hexagonal crystal structure when $0.18 \leq b \leq 3.1$ and $0.3 \leq c+d \leq 8.1$ in the Chemical Formula 1.

4. The metal-organic framework of claim 3, wherein the metal-organic framework having the hexagonal crystal structure has a specific surface area of 900 m²/g to 1500 m²/g.

5. The metal-organic framework of claim 1, wherein the metal-organic framework has the mixed hexagonal and tetragonal crystal structure when $0.15 \leq b \leq 0.18$ and $3 \leq c+d \leq 8.1$ in the Chemical Formula 1.

6. The metal-organic framework of claim 5, wherein the metal-organic framework having the mixed hexagonal and tetragonal crystal structure has a specific surface area of 500 m²/g to 900 m²/g.

7. A low-temperature regenerable composition for moisture adsorption, the composition comprising the MOF of claim 1 as a moisture adsorbent.

8. A composition for gas adsorbing separation, the composition comprising the MOF of claim 1 as a gas adsorbent.

9. A method for preparing a metal-organic framework having a hexagonal crystal structure or a mixed hexagonal and tetragonal crystal structure with a three-dimensional porous structure represented by Chemical Formula 1, the method comprising performing a reaction by hydrothermal synthesis using a reaction solution prepared by adding a ligand precursor solution to a metal precursor solution providing trivalent aluminum ions:

$$[Al_8(OH)_a(BTC)_b(IPA)_c(L)_d] \qquad \text{[Chemical Formula 1]}$$

wherein,

L is an isophthalic acid analog; and $8 \leq a \leq 22$, $0.15 \leq b \leq 3.1$, and $0.3 \leq c+d \leq 8.1$, in which c and d each are independently a rational number of 0 or greater, wherein BTC represents 1,3,5-benzenetricarboxylic acid, and IPA represents isophthalic acid.

10. The method of claim 9, wherein the ligand precursor solution comprises caustic soda, potassium hydroxide, ammonia, sodium aluminate, or a mixture thereof.

11. The method of claim 9, wherein the reaction solution comprises a metal precursor and a ligand precursor at a molar ratio of 1:1 to 1:0.3.

12. The method of claim 9, wherein the reaction is performed at 50° C. to 150° C. for 2 to 24 hours.

* * * * *